W. R. WEBSTER.
MACHINE FOR DRAWING METAL BLANKS.
APPLICATION FILED DEC. 13, 1906.

1,132,531. Patented Mar. 16, 1915.
6 SHEETS—SHEET 2.

WITNESSES:
INVENTOR
William R. Webster
BY
ATTORNEYS.

W. R. WEBSTER.
MACHINE FOR DRAWING METAL BLANKS.
APPLICATION FILED DEC. 13, 1906.

1,132,531. Patented Mar. 16, 1915.
6 SHEETS—SHEET 3.

WITNESSES:

INVENTOR
William R. Webster
BY Beach & Fisher
ATTORNEYS.

W. R. WEBSTER.
MACHINE FOR DRAWING METAL BLANKS.
APPLICATION FILED DEC. 13, 1906.

1,132,531.

Patented Mar. 16, 1915.
6 SHEETS—SHEET 4.

WITNESSES:
Sam'l J. Birard
Hettie E. Cooper

INVENTOR
William R. Webster
BY
Beach & Fisher
ATTORNEYS.

W. R. WEBSTER.
MACHINE FOR DRAWING METAL BLANKS.
APPLICATION FILED DEC. 13, 1906.

1,132,531.

Patented Mar. 16, 1915.
6 SHEETS—SHEET 5.

WITNESSES:

INVENTOR

ATTORNEYS.

W. R. WEBSTER.
MACHINE FOR DRAWING METAL BLANKS.
APPLICATION FILED DEC. 13, 1906.

1,132,531.

Patented Mar. 16, 1915.
6 SHEETS—SHEET 6.

WITNESSES:

INVENTOR
William R. Webster
BY
ATTORNEYS.

UNITED STATES PATENT OFFICE.

WILLIAM R. WEBSTER, OF BRIDGEPORT, CONNECTICUT.

MACHINE FOR DRAWING METAL BLANKS.

1,132,531.  Specification of Letters Patent.  Patented Mar. 16, 1915.

Application filed December 13, 1906. Serial No. 347,619.

*To all whom it may concern:*

Be it known that I, WILLIAM R. WEBSTER, a citizen of the United States, and a resident of the city of Bridgeport, county of Fairfield, in the State of Connecticut, have invented new and useful Improvements in Machines for Drawing Metal Blanks, whereof the following, in connection with the drawings, is a specification.

This invention relates to drawing machines or draw benches for drawing metal blanks, such as tubes or rods of ductile metal.

The invention refers especially to a machine designed for drawing tubes, and it also pertains more particularly to a machine adapted for automatic operation, as hereinafter set forth, but these features are not essential in all aspects of the invention.

My improvements also relate especially to a draw bench wherein the blank is propelled through the die by a pulling action, as distinguished from a pushing action, but this feature is likewise immaterial in the broader phases of the invention.

One of the primary objects of the invention is the general improvement and simplification of the construction and operation of metal drawing machines.

Other objects of the invention are the provision of simple, efficient means for carrying or feeding the blank into position to be drawn; the improvement of the jaw mechanism of the draw-head, with the object of insuring reliable operation thereof in gripping the blank preparatory to the drawing operation; the provision of means whereby each blank is conveniently discharged from the machine and disposed of as soon as the blank passes out of the die; and the provision of an improved form of drawhead adapted to discharge the blank by gravity as soon as it is released by the jaws of the draw-head.

It is also proposed to furnish a drawing machine having improved means for controlling automatically the operation of the draw-head, and I also aim to provide a drawing machine in which the blank feeding mechanism and the drawing mechanism proper are each operated by a suitable prime mover, and wherein the prime mover of one of said mechanisms is automatically controlled by the other mechanism.

To these and other ends, the invention consists in the novel features and combinations of parts to be hereinafter described and claimed.

In the drawings, Fig. 5ª a transverse vertical section on line T—U of Fig. 5 showing the back yoke.

In all figures, like numerals indicate similar parts.

The general arrangement of the machine comprises a hydraulic draw bench operated by a cylinder and piston of the usual construction, a feeding and assembling mechanism on one side thereof, and an extension in alinement with the draw bench, provided with a second hydraulic cylinder and piston to operate the mechanism contained in and connected with said extension.

Referring to the drawings for a more particular description, the invention is therein shown embodied in a machine having a draw bench, on the ways of which a drawhead 10 is adapted to slide in usual manner. At the farther end of the draw bench is the die 11. Parallel with and at one side of the draw bench is a dip trough 2, having at one side inclined skids 1 of suitable construction to carry tubes 32, or similar blanks. An extension projects longitudinally from the draw bench and dip trough adapted to carry the triblet rod 13 and its operating parts.

The mechanism for feeding the tubes from the skids 1 into the dip trough is as follows: Castings 70 extend transversely across the trough 2 and furnish bearings for a rock shaft 4 projecting longitudinally in said trough. The shaft 4 has laterally projecting arms 5 on which are pivotally mounted feed fingers 3 (Fig. 3), so that upon the rotation of the rock shaft 4 on its axis one of the feed fingers 3 will engage the lowermost tube 32 on the skids 1.

In order that the space between the upper ends of the feed fingers 3 will correspond substantially to the diameter of the blanks, links 6 secured to an adjusting shaft 7 are provided with apertures through which the feed fingers 3 project. The mechanism for operating the adjusting shaft 7 is shown in detail in Figs. 7 and 8 in which 61 designates a fixed bracket secured to the side of the trough 2. The adjusting shaft 7 projects through the bracket 61 and has check nuts 62 screwed on it to hold it in its adjusted position against longitudinal movement. The inner ends of the links 6 are pivoted at 63 to the shaft 7 and the feed fingers 3 project upward through a slot 64 in the castings 70 and are guided therein. To adjust the feed fingers, the adjusting shaft 7 is moved longitudinally when the upper ends of the fingers are drawn nearer together or forced farther apart by the links 6, as may be desired. Several sets of feed fingers and adjusting devices are located at convenient distances along the length of the dip trough 2 and the rock shaft 4 and adjusting shaft 7 extend substantially through its whole length.

Figures 3, 7:
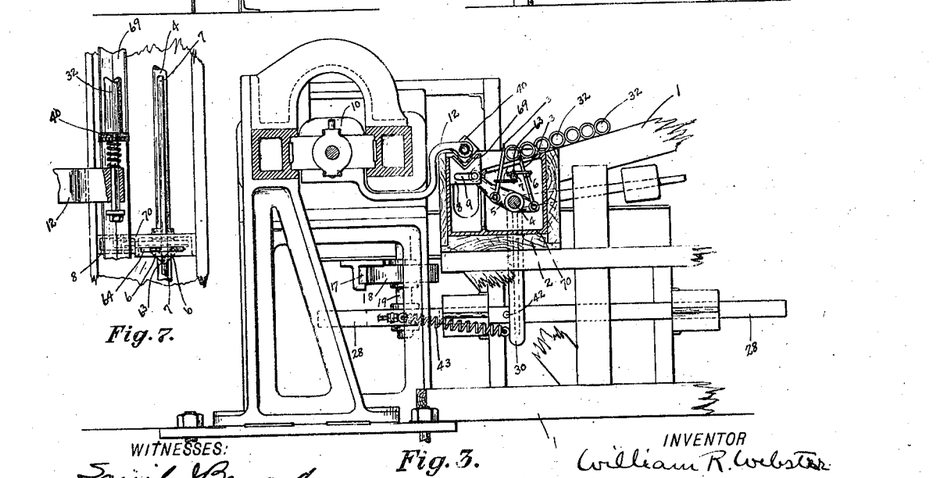
Fig. 3 is a sectional elevation taken through the line A—B in Fig. 1, showing the draw bench, dip trough, one set of the devices for feeding and dipping the blanks, and the pusher for pushing the same on the triblet rod. Some of these parts are shown in cross section and others not.
Fig. 7 is a plan showing the mechanism for adjusting the feed fingers, also showing the spring pusher for pushing the blank over the triblet rod.

Vertically moving slides 8 in the castings 70 are adapted to be operated by extensions of the arms 5 on the rock shaft 4 as the extensions have pins adapted to work in slots 9 in the slides 8, as more particularly shown in Fig. 3. The slides 8 carry a carrier 69 V shaped in cross section which extends substantially through the whole length of the dip trough 2.

Figure 8:
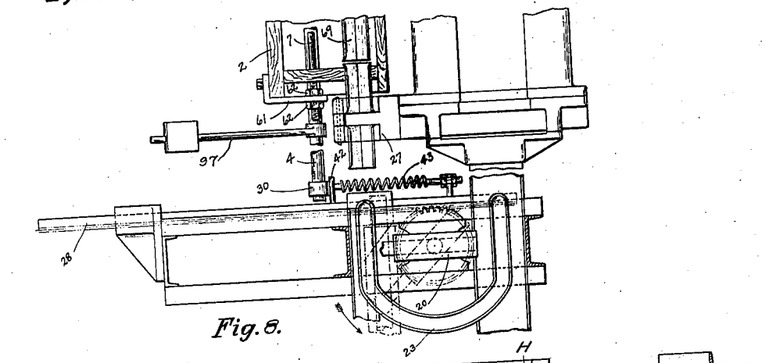
Fig. 8 is a sectional plan view on the line E—F in Fig. 9, of the mechanism for pulling the blank out of the guide, transferring the assembled triblet rod and blank into alinement with the die and draw bench and pushing the reduced end of the blank through the die. Said figure also shows the lower members of the throat or guide for bringing the blank and triblet rod into proper alinement for assembling the blank and rod; and also shows some of the means for transmitting motion to the devices for feeding the blanks into the dip trough. The triblet rod and carrier are omitted.

When the blanks are placed on the inclined skids 1, their reduced ends are pointed away from the plane of the die. The blanks are prevented from rolling down into the dip trough 2 by the feed fingers 3. As the feed fingers are reciprocated by the rock shaft 4, the lowermost blank is released by the inner feed fingers 3 to roll down into the dip trough on to the V shaped carrier 69 which is in its lowermost position. At the same time, the next blank is caught by the other feed fingers 3. When the rock shaft 4 is turned so that the carrier 69 is raised and the feed fingers 3 again reciprocated this succeeding blank is permitted to roll down until caught by the feed fingers 3 nearer the trough. (Figs. 3 and 8). The mechanism for operating the rock shaft 4 is explained hereinafter.

Figure 1:
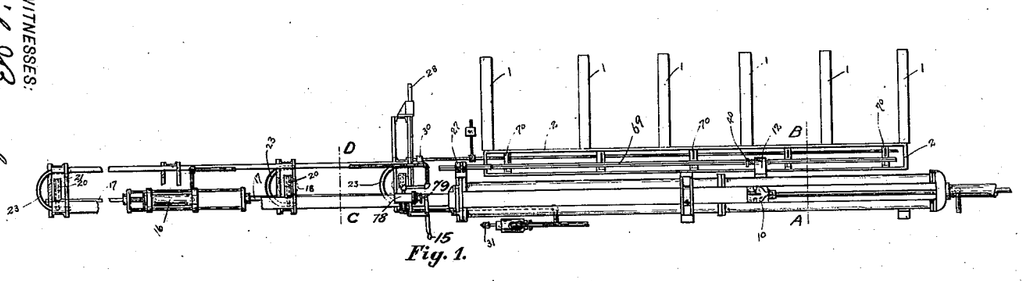
Figure 1 is a diagrammatic top plan illustrating the general arrangement of the machine, cut away to show the hydraulic cylinder for operating the mechanism contained in and connected with the extension, and Fig. 2 a diagrammatic side elevation illustrating the arrangement of the extension and draw bench, the side of the latter being broken away to show the drawhead.
Figure 2:
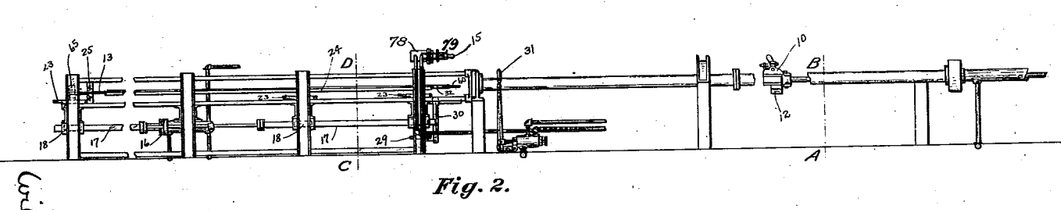

A pusher arm 12 is carried by the drawhead 10, and projects laterally therefrom over the V shaped carrier 69 (Fig. 1). The pusher arm 12 is provided with a spring pusher 40 (Fig. 7) adapted to engage the end of the blank, when in the carrier, and when the latter is in its raised position. By this means the movement of the drawhead 10 toward the die 11 forces the blank longitudinally out of the carrier 69.

The triblet rod 13 which is provided with the usual triblet or bulbous head 14 is mounted as follows: Beneath the extension is a hydraulic cylinder 16 with its piston controlled by a lever 15 near the die 11 at the end of the draw bench. A longitudinally extending rack 17 is connected with the piston of the hydraulic cylinder 16, and is adapted to engage and rotate pinions 18, mounted on the under side of the standards of the draw bench extension. The pinions 18, as more particularly shown in Fig. 6, are mounted on vertical shafts 19, which are journaled in the supports of the extension and are provided at their upper end with heads 20, through which project laterally sliding arms 21, having at their outer ends depending rollers 22 adapted to travel in U shaped cam tracks 23 mounted on the supports of the extension.

A longitudinally extending carrier trough 24 is pivotally secured to the outer ends of all the sliding arms 21 (except the rearmost), so that as the heads 20 are rotated and the outer ends of the arms travel backward and around over the U shaped cam track 23, the carrier trough 24 will be drawn backward and around to the other side of the extension correspondingly.

Figure 6:
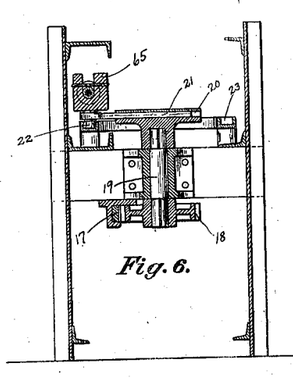
Fig. 6 is a cross section on the line R—S in Fig. 4 of the same mechanism.
Figure 11:
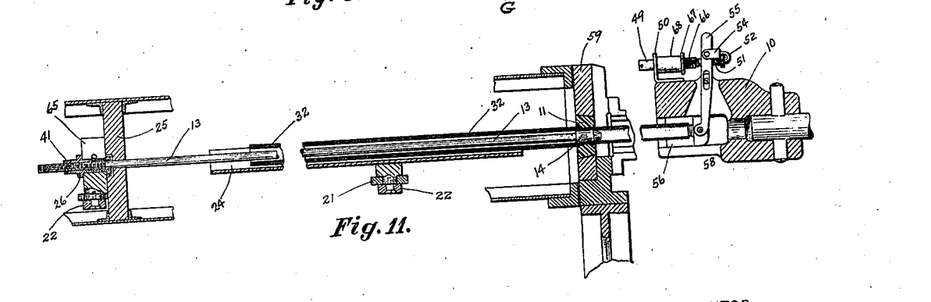
Fig. 11 is a vertical longitudinal section showing the triblet rod in position in the die, and the devices for adjusting the triblet rod with respect to the die and the back yoke for holding said rod in proper relation to the die during the operation of drawing the tube. Said figure also shows the tube surrounding the triblet rod, die plate and drawhead.

The triblet rod 13 is provided at its rear end with a spool shaped stop 26 adapted to be threaded on the rod, and the stop is also adapted to fit into and be engaged by a vertically slotted head 65, mounted on the rearmost arm 21 (Figs. 6 and 11). A check nut 41 is screwed on the end of the triblet rod to hold the screw threaded spool shaped stop from movement on the rod.

The triblet rod 13, as more particularly shown in Fig. 11, is adapted to lie on or above the carrier trough 24 (with which it is adapted to have substantially the same movement) except that its bulbous head or triblet 14 projects beyond the trough.

Upon the movement of the piston of cylinder 16, the rack 17 is moved longitudinally, thereby rotating the pinions 18. The rotation of these pinions 18, several of which are located at convenient distances along the length of the extension, is transmitted through the shafts 19 and heads 20 to the sliding arms 21, whose depending rollers 22 fitting in the U shaped cam tracks 23 carry the ends of the arms 21 around in the path prescribed by the cam tracks. The carrying trough 24 and triblet rod 13 are carried around correspondingly.

Figure 4:
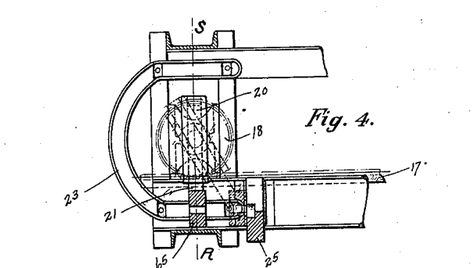
Fig. 4 is a sectional plan on the line P—Q in Fig. 5 of the mechanism for transferring the rear end of the triblet rod from one side to the other of the extension, and for moving said rod forward and backward in alinement with the opening in the die, on one side of the extension; and in alinement with the mechanism for assembling the blanks and rod, on the other side of the extension.
Figure 5:
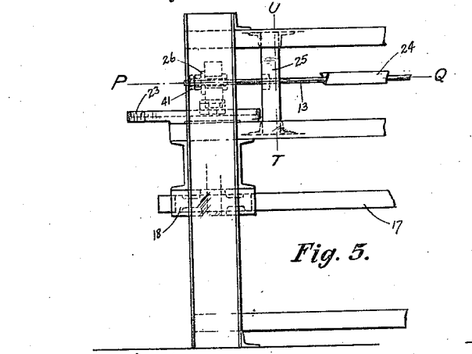
Fig. 5 is a side elevation of the above mentioned mechanism.
Figure 5A:
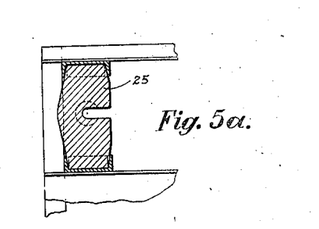

To check the forward movement of the triblet rod 13 when in alinement with the die 11, a back yoke 25, which, as more particularly shown in Fig. 5ª, is slotted horizontally from one side to the middle, is mounted on the extension adjacent to the rearmost support. When the arms 21 have been rotated to the position shown in full lines (Fig. 4), the trough and triblet rod have been transferred from the side of the extension rod in alinement with the dip trough 2 to the other side of the extension in line with the die 11. In this position, the triblet rod has passed into the horizontal slot of the back yoke 25 (Figs. 5 and 11). Upon the further rotation of the shaft 19, the arm 21 is brought to the position indicated in dotted lines (Fig. 4), in which the spool shaped stop 26 abuts against the back yoke 25, thereby positively limiting the further movement of the triblet rod in this direction. The back yoke thus provides a substantial brace for the triblet rod while the blank is being drawn off the triblet rod over its bulbous head 14, through the die 11, by the drawhead 10.

Figure 12:
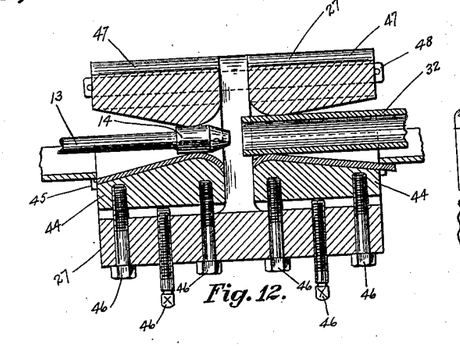
Figs. 12 and 13 show in vertical longitudinal section on the line K—L, Fig. 13, and in end view, respectively, the guide for bringing the ends of the triblet rod and the bore of the blank into line before the blank and rod are assembled.
Figure 13:
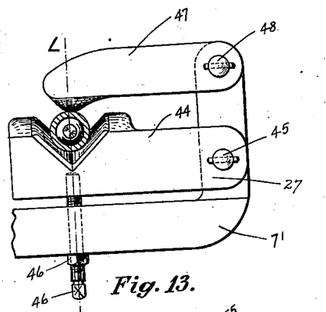

In order that a blank 32 when pushed off the carrier 69 by the pusher arm 12 will pass on to the triblet rod (when the latter is in alinement therewith), a guide 27 is provided between the end of the trough 2 and the extension, which is shown in detail in Figs. 12 and 13.

The guide 27 consists of a substantially L shaped frame 71 with an upright arm, on which are pivoted by fulcrum pins 45 two lower sections 44, provided near their outer ends on their upper surfaces with V shaped grooves. Above these lower sections, upright sections 47 are pivoted by means of fulcrum pins 48 to the upright portion of the frame 71. The lower sections 44 are raised or lowered by adjusting screws 46, projecting through the horizontal portion of the frame 71. When the end of the blank is pushed on to the guide 27, it projects into the V shaped groove on one of the lower sections 44, and is yieldingly held therein by the weight of the corresponding upper section 47. The bulbous end 14 of the triblet rod 13 is correspondingly held between the other sections 44 and 47, so that upon the further movement of the blank 32 its end will be guided over the bulbous end 14 of the triblet rod.

Figures 9, 10:
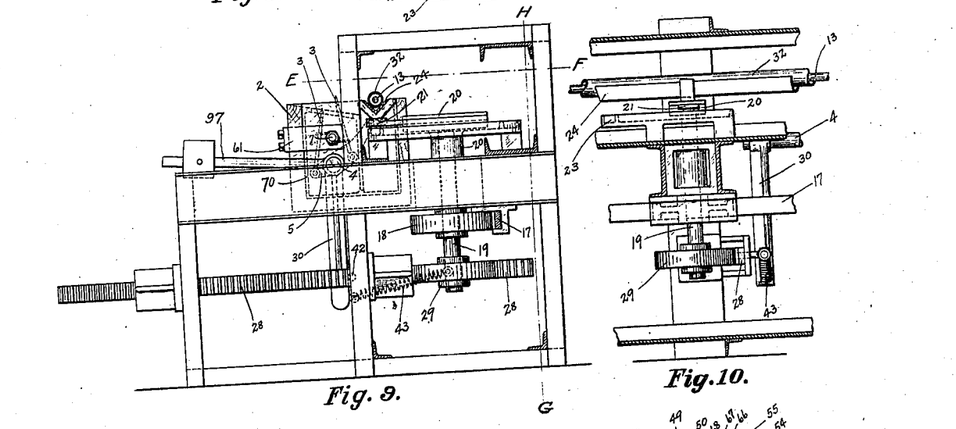
Fig. 9 is a sectional elevation taken through the line C—D in Fig. 2, with draw bench omitted, showing the mechanism in elevation, looking toward the dip trough and draw bench, and said figure also shows more fully the mechanism for transmitting motion to the dip trough feed.
Fig. 10 is a sectional side elevation of the same parts, looking from the draw bench side of the machine, taken on the line G—H in Fig. 9.

The movement of the carrier 69 is so timed that it will be in its raised position (Figs. 3 and 9) when the triblet rod 13 and carrying trough 24 are on that side of the extension in alinement therewith. This is accomplished through the following mechanism: On the shaft 19, which is nearest to the draw bench below the rack 17 is a further pinion 29 (Figs. 9 and 10) adapted to engage a rack 28 movable transversely to the line of the extension. The rack 28 is provided with a stud 42 adapted to engage an arm 30 depending from the rock shaft 4 of the dip trough 2. A spring 43 connected with the arm 30 and pinion 28 tends to hold the arm in contact with the stud 42. By this means, upon the rotation of the shaft 19 and pinion 29, the rack is moved in one direction or the other and the lever swung therewith. The swinging lever 30 rotates the rock shaft 4 in the dip trough 2 to raise one or the other of the fingers 3, and to raise or lower the carrier 69. The rock shaft is also shown provided with a counter weighted arm 97 to normally hold it in one position if the spring 43 and extension are limited.

When the shaft 19 is rotated as the triblet rod is being moved around into alinement with the carrier 69, the stud 42 on the rack 28 is moved to the right (Fig. 9) and the arm 30 will follow it under the influence of spring 43. This motion of the arm 30 turns the rock shaft on its axis and lifts the carrier 69 from the dip trough 2, so that any blank therein will be brought into alinement with the open throat of the guide 27. At the same time, another blank is permitted to pass the outer feed fingers 3 (as they are drawn downward) to be caught by the inner set of feed fingers 3 at the same time.

The object of using a spring 43 or counter weight is to avoid the possibility of injuring the machine, for if a crooked blank became jammed in the dip trough, or in case the operator failed to manipulate the operating levers in their proper order, the spring would not rotate the rock shaft, but permit it to remain stationary.

The drawhead is shown provided with jaws 56 sliding between converging ways 57. The head is left open below the jaws, as shown at 58 (Figs. 14 and 15. The mechanism for operating the jaws 56 is as follows: As shown more particularly in Figs. 14, 15, 16 and 17, a hollow cylindrical socket 49, the forward end of which is closed, is slidably mounted on a support 50 secured to the drawhead 10. A coiled spring 51 is seated in the socket 49, and surrounds an arm 52, which is doubled on itself, and at its outer end terminates in a yoke 54, embracing and pivotally secured to a lever 55. A stop nut 53 is adapted to be screwed on the end of the arm 52 which projects into the socket 49, and the spring 51 bears at one end against this stop 53 and at its other end against the closed end of the socket 49.

Figure 14:
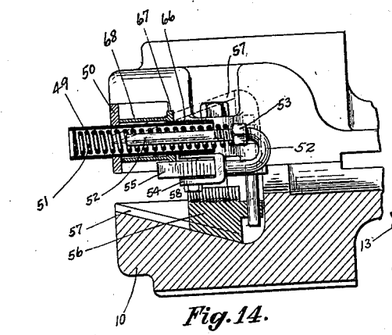
Fig. 14 is a horizontal section on the line X—Y in Fig. 17 showing devices for automatically actuating the lever of the draw-head, and also showing one half of the draw-head in longitudinal horizontal section on the line M—N in Fig. 17.
Figure 15:
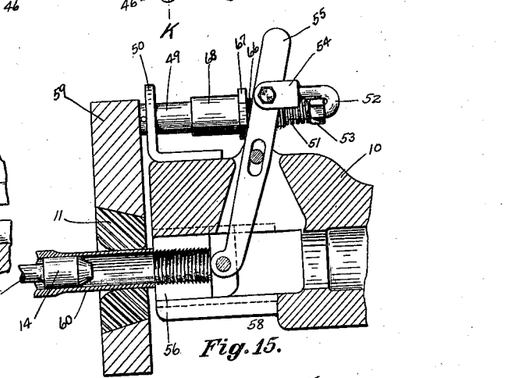
Fig. 15 is a longitudinal vertical section through the middle of the drawhead and die, showing in elevation the devices for actuating the lever of the drawhead. In this figure, the jaws of the drawhead are shown in their forward, closed position, and the reduced end of the blank is shown in section in the operation of passing through the die and butting against the ends of the closed jaws.
Figure 16:
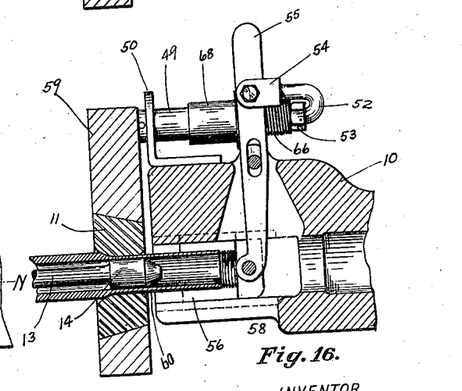
Fig. 16 is a similar view of the same parts showing their position after the operation of pushing the end of the blank through the die is completed.
Figure 17:
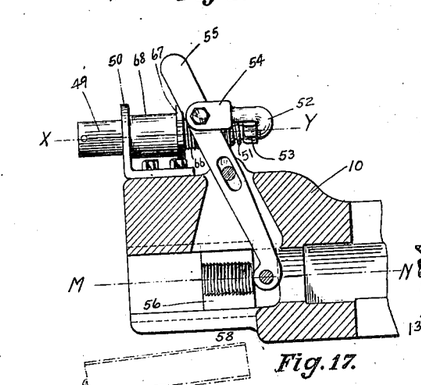
Fig. 17 is a similar view of the drawhead alone, showing the position of the parts at the time when the drawing of the tube is completed and the latter falls out of the drawhead.

The die 11 is mounted on a plate 59 against which the end of the socket 49 is adapted to abut, when the drawhead is brought forward adjacent to the die (Figs. 15 and 16). On the other end of the socket 49 is external threading for the reception of a nut 67 carrying a hollow tubular sleeve 68, the end of which abuts against the back of the support 50, when the spring 51 is expanded. (Figs. 14 and 17.) When the draw head approaches the limit of its movement toward the die the tubular socket 49 strikes against the die plate 59 and is forced to the right with respect to Fig. 14, so as to compress the spring 51. This tends to swing the lever 55 into the position shown in Fig. 15, whereby the jaws are yieldingly thrust forward into their closed position and held in such position by the pressure of the spring 51. In the position shown in Fig. 15 the jaws will not admit the reduced end of the blank between their gripping surfaces, but as the blank is thrust into the die it pushes the jaws to the right with reference to Fig. 15, against the pressure of the spring until said jaws open wide enough to admit the blank. In this position the grip of the jaws is due only to the pressure of the spring, but it is sufficient to cause the jaws to be drawn forward between their converging ways 57 as soon as the draw head begins to move away from the die, and thus to give them the positive grip for drawing the blank through the die. When the frictional grip of the die upon the blank is terminated by the drawing of the blank through the die the shock is sufficient to open the jaws of the draw head by driving them to the right (with reference to Fig. 16) relative to the draw head, whereby the blank is automatically released from the jaws at approximately the same time that it is released from the drawing surface.

The valve mechanism for operating the hydraulic draw-head 10 is of the well known type consisting of a pilot valve 93 and an actuating valve 94 controlled by a lever 31.

Figures 18, 20:
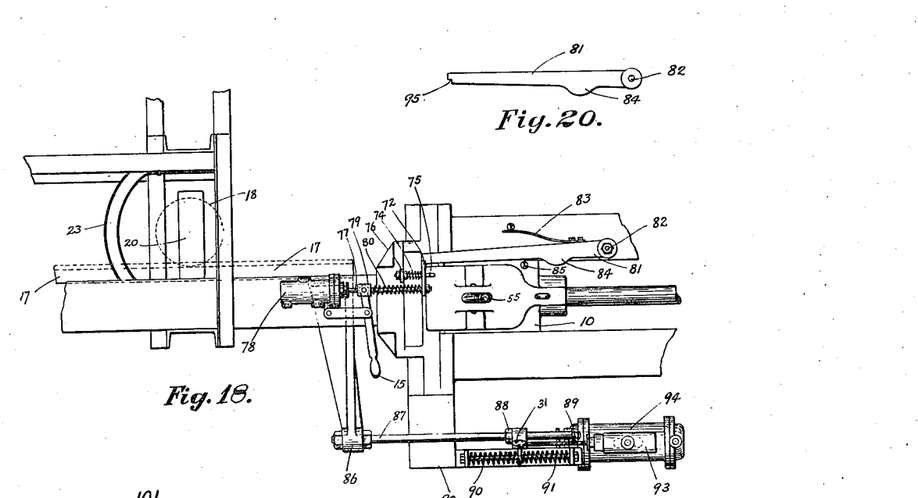
Fig. 18 is a plan view of the devices for causing the extension and draw bench mechanism to be automatically operated through the valves controlling the extension cylinder and bench cylinder, respectively.
Fig. 20 is a detail of the latch shown in Fig. 18.
Figure 19:
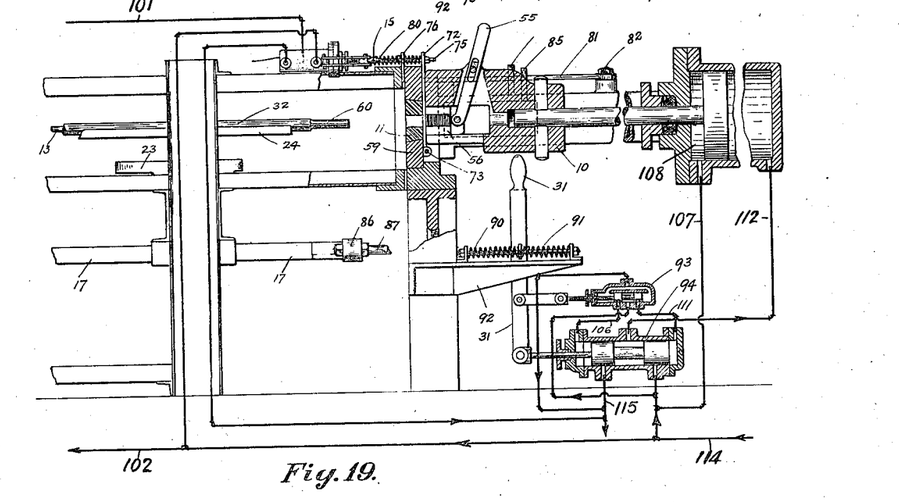
Fig. 19 is an elevation of the same devices, shown partly in longitudinal vertical section.

The levers 15 and 31 controlling the extension and draw bench mechanisms respectively may be operated by hand. The following mechanism is provided to automatically operate them if desired: Pivoted to the face of the die plate 59 at 73 is a flat lever 72, more particularly shown in Figs. 18 and 19. A rod 75 is supported in bearings in a bracket 76 mounted on the die plate 59. The rod 75 projects through an aperture in the lever 72, and is provided with a spring 74 which bears against the lever and normally tends to press it away from the die plate. A piston rod 77 of a valve 78 mounted on the extension to the draw bench also projects through an aperture in the lever 72, and is provided with a spring 80 which bears against the lever 72, and the collar 79, mounted on the piston rod 77, and pivotally connected to the hand lever 15. The spring 80 is sufficiently strong to operate the valve when compressed by the movement of the lever toward the die plate.

A latch 81 is pivoted on the draw bench at 82, and is provided at its free end with a notch 95 (Fig. 20) adapted to engage the pivoted lever 72 on the die plate 59. The lever 81 is held in position by a flat spring 83, and is provided with a cam 84 adapted to be engaged by a pin 85 on the drawhead, so that upon the movement of the drawhead the pin 85 coming into contact with the cam 84 will swing the latch outward against the tension of spring 83.

A bracket 86 is carried by the longitudinal rack on the extension to the draw bench (as shown more particularly in Figs. 18 and 19), and projects laterally therefrom, and is provided with a rod 87 having adjustable stops 88 and 89 situated a slight distance apart. These stops 88 and 89 are adapted to come in contact with the lever 31 above referred to, and move the same forward and backward when the rack is moved longitudinally and approaches the limit of its forward and backward movement. The lever 31 is normally held in the central and neutral positions between the two stops 88 and 89 by means of two opposing springs 90 and 91 secured thereto and mounted on a bracket 92 secured to the draw bench.

Figure 22:
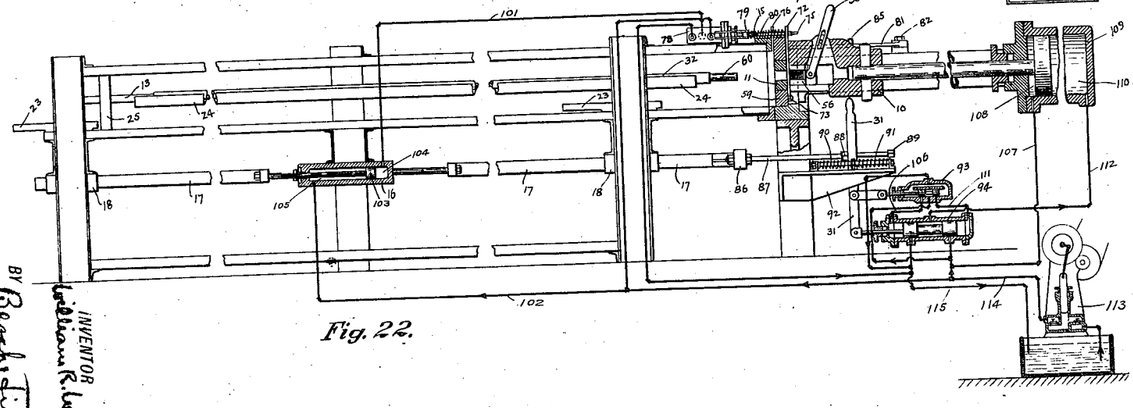
Fig. 22 is a side elevation showing diagrammatically the pipe connection between the several valves, cylinders and pump, partly in vertical section, one of the valves and its controlling levers being shown in somewhat modified form.

The valve 78 operates the extension cylinder 16 through the piping 101 and 102 shown diagrammatically in Fig. 22, and is of the ordinary three way type, and the piston 103 of the extension cylinder 16 is a differential piston, the smaller side of which is under constant pressure and the mode of operating such cylinder and piston by means of the three way valve is readily understood.

The mode of operation of the machine is as follows: Starting with the drawhead 10 drawn back to its position of greatest distance from the die, when the drawhead is in such position the various mechanisms of the machine are so timed that the carrier 69 will be at its lower position beneath the surface of the lubricating fluid in the dip trough 2 and the triblet rod 13 will be in alinement with the opening of the die 11 and its bulb 14 will be pushed forward into the mouth of the die in the position which it occupies during the operation of drawing down a blank. At this point, one of the blanks will be presumed to have fallen from the skids into the dip trough 2 and onto the V-shaped carrier 69. The operator moves the lever 15 so as to admit water pressure to that end 104 of the extension cylinder 16 which is nearest the die, causing the piston contained in the cylinder to move away from the die carrying with it the rack 17, which, as above described, engages with and rotates the several pinions 18. The rotation of these pinions by means of the vertical shafts 19 and associated parts, as already pointed out, first retracts the carrying trough 24 which is pivotally connected to the ends of the forward arms 21, and the triblet rod 13 connected by means of the slotted head 65 to the rearmost arm 21 from the die, then carries them out of alinement with the die, and into alinement with the guide 27 at the end of the dip trough 2, and then moves them in the path of the cam tracks 23 until the projecting end 14 of the triblet rod 13 enters one portion of the guide 27. During this operation, the arm 30 depending from the rock shaft 4 is released from engagement by the stud 42 (Figs. 8 and 9) and the arm 30 is swung by spring 43 and the rock shaft 4 rotated to raise the carrier 69 in the dip trough 2 to bring a blank in alinement with the guide 27, as above described. The operator now shifts the lever 31 which causes the hydraulic drawhead from the operation of its cylinder 109 to travel toward the die carrying with it the pusher 12 which strikes the reduced end of the blank, lying in the carrier 69, and pushes the other end of the blank into the throat of the guide 27 and over the triblet rod, which is held against longitudinal displacement by the slotted head 65 and spool shaped stop 26. When the movement of the drawhead toward the die is completed, the blank except for its reduced end surrounds the triblet rod, and the assembled blank and triblet rod rest in the carrier trough 24, and the drawhead 10 is in position to engage the reduced end of the blank when the latter is thrust through the die. The spring cushion 40 on the pusher 12 absorbs the shock of impact with the blank. The operator now shifts the lever 15 so as to admit hydraulic pressure to the rear end 105 of the cylinder 16 which causes the carrier trough 24, triblet rod and blank to be first retracted from the guide 27, and then carried over into alinement with the opening in the die. In this movement, the rear end of the triblet rod is carried by the slotted head 65, and said rod passes into the horizontal slot in the back yoke 25. The carrier trough, rod and blank are then moved forward in alinement with the opening in the die until the reduced end of the blank is thrust through the die and gripped by the jaws 56 of the drawhead, as above described. The head 65 now rests against the back yoke 25, which takes the tensile strain transmitted through the rod in the operation of drawing the blank, and the triblet or bulb 14 is in proper relation to the die, said relation being fixed by the position of the screw threaded stop 26 on the rear end of the rod, and by the back yoke 25 (Figs. 4 and 11). At the same time, the rock shaft 4 is rotated by the arm 30 and stud 42 in such direction as to lower the trough 69 below the surface of the lubricating fluid in the dip trough, and to draw downward the inner set of feed fingers to permit the escape of another blank into the dip trough, and to lift the outer set of feed fingers to hold back the remaining blanks. The operator now shifts the lever 31 and the drawhead is retracted by hydraulic pressure in the usual way, drawing the blank through the die.

Figure 21:
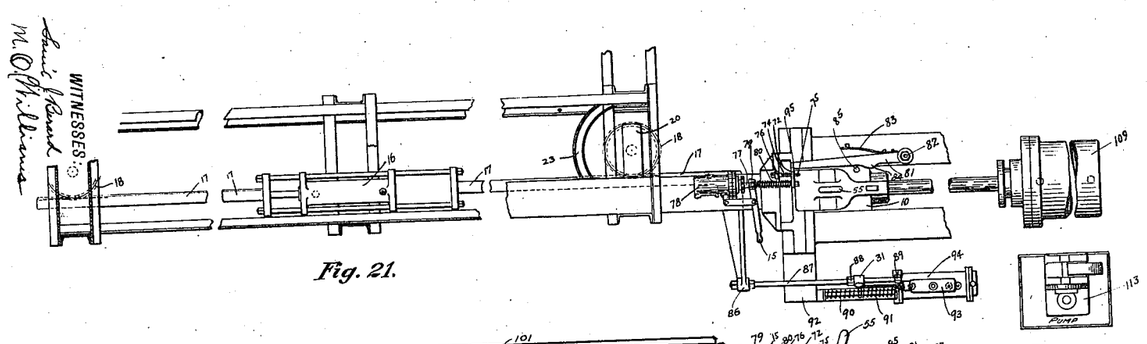
Fig. 21 is a top view of the draw bench and extension partly broken away.

In the foregoing description, it has been assumed that the levers 15 and 31 for controlling the valve mechanism and draw bench mechanism, respectively, are operated by hand. These levers and the controlling valves connected with them may, if desired, be operated automatically by the devices shown in Figs. 18, 19, 20, 21 and 22 as follows: The drawhead as it approaches the die-plate, and during approximately the last inch and a half of its movement in this direction, strikes the lever 72, hinged at 73 (Fig. 19) and pushes its free end up against the die-plate 59, thereby compressing the spring 80, which moves to the left (Fig. 18) the end of lever 15 pivoted to the piston rod 77 of the cylinder valve 78. This movement of the piston of the valve 78 to the left releases pressure by means of piping 101 to the extension cylinder 16, to one side of its piston 103 to cause the triblet rod and blank to be carried from the feeding side of the machine over into alinement with the die. The reduced end of the blank is passed through the die and is engaged directly or otherwise by the jaws of the drawhead by means of the mechanism heretofore described. In the meantime the catch 95 on the latch 81 (Figs. 18 and 20) engages with the lever 72 to hold it in the position indicated in Figs. 18 and 19. As the rack 17 is moved to the right by the piston of the extension cylinder 16 the stop 88 (Figs. 18, 21 and 22) on the rod 87 strikes against the lever 31 which is what is commonly known as a floating lever, and is pivoted at two points, one at the free end of the piston rod of actuating valve 94, and the other at the end of a link pivoted to the piston rod of the pilot valve 93. The stop 88 pushes the upper end of this lever 31 to the right (Figs. 19 and 22) so that the piston of the pilot valve 93 is moved to the right, which permits pressure to be admitted through piping 111 to the right hand end of the actuating valve 94 and connects the left hand end of valve 94 by piping 106 with the exhaust. Hence the piston of valve 94 is moved to the left to connect the right hand end 110 of the drawbench cylinder 109, through piping 112 with the exhaust 115. As the left hand end 108 of the drawbench cylinder 109 is connected by piping 107 with the pressure 114 from a hydraulic pump 113 the piston of the drawbench cylinder will be moved to the right (Fig. 22) and the drawhead moving in that direction tightens its grip upon the blank, as already described. The lever 72 is in the meantime held by the catch 95 from backward movement until the pin 85 on the drawhead strikes the cam 84 on the latch 81 (Fig. 18) and releases it. When lever 72 is thus released it is forced to the right under the tension of spring 74 and the rod 77 connected with the piston of the valve 78 is moved to the right by the spring 80, which would reverse the action of the piston 103 of the extension cylinder 16, except that the triblet rod is prevented from moving in the reverse direction (to the left, away from the die 59; see Fig. 22) by the friction developed in drawing the blank through the die, which "sucks" the triblet rod firmly into the die throughout the operation of drawing the blank, and thereby forcibly prevents the extension mechanism from reversing until the operation of drawing the blank is completed.

The object of holding the lever 72 until the drawhead has been drawn to the right a short distance is to insure that the triblet or plug shall begin to "suck" before the lever 72 is released. Thus the reversing mechanism is controlled or held from actuation by the engagement of the blank with the die and triblet rod and drawhead.

When the tube is drawn and has passed out of the die the triblet or plug is released from this "sucking" or frictional contact and the extension cylinder immediately operates the rack 17 and rod 87. Near the end of this reverse movement of the rod toward the left (Fig. 22) the stop 89 on the rod 87 comes in contact with the upper end of lever 31 and moves this end of the lever on its lower pivot far enough to the left to shift the piston of the pilot valve 93 to connect the right hand end of the actuating valve 94 through piping 111 with the exhaust, and the left hand end through piping 106 with the pressure, which shifts the piston of valve 94 to the right so as to connect the right hand end 110 of the drawbench cylinder 109 by means of piping 112 with the pressure from the hydraulic pump 113 and piping 114.

The cylinder 109 is what is known as a differential cylinder. The left hand end 108 is always under hydraulic pressure. When, however, pressure is admitted to the right hand end 110, the piston of the cylinder will be moved to the left because the area of the piston on the right hand side is greater than the area of the piston on the left hand side (Fig. 22) by the cross sectional area of the piston rod, and hence as there will be greater pressure on the right hand side of the piston it will be moved to the left and the drawhead connected therewith will be moved backward toward the die 59 to grip another blank, which in the meantime has been assembled on the triblet rod.

While the tube is being drawn, the frictional grip on the tube while passing through the die holds the jaws of the drawhead closed on the tube, but when the tube has entirely passed through the die the shock due to the release of the high tension is sufficient to drive the jaws of the drawhead backward and they will be opened by spring 51 and release the tube, which will then fall into any suitable receptacle placed for the purpose underneath the ways of the drawbench, for, (as more particularly shown in Fig. 3) the ways of the drawbench for the drawhead are supported from above so that between them is an opening through which the blank may be discharged by gravity.

The above description has shown the cycle of operations when the valves 78 and 93 are operated by the automatic mechanism shown in Figs. 18, 19, 21 and 22, and the operations will be repeated automatically so long as the inclined rack 1 is kept supplied with blanks.

In case levers 15 and 31 are operated by hand, the operator merely shifts the lever 15 after a tube is drawn to reverse the extension mechanism, and then shifts lever 31 to reverse the drawhead.

Instead of engaging the end of the blank itself the drawhead may engage a hook of ordinary construction, such as shown in patent to Stiefels, No. 718,671, granted January 20th, 1903.

The apparatus above described is adapted for handling and drawing both heavy and light blanks. In practice it is found that the machine will handle and draw blanks as fast as the drawhead can be conveniently reciprocated. The time required for shifting the extension mechanism from one side to the other of the extension is very slight, and the time occupied by the reverse movement of the drawhead toward the die is used for assembling a fresh blank on the triblet rod. The saving of time and labor is very great as compared with former methods of handling and drawing blanks. The apparatus may be used for drawing rods by simply taking out the triblet rod.

While the foregoing description is necessarily a detailed one in so far as it concerns the particular form of my machine selected for illustration and description, it will be obvious that numerous modifications in the construction may be adopted without digressing from my inventive idea as expressed in the claims.

What I claim and desire to secure by Letters Patent is:—

1. In a tube drawing machine, the combination with a die; of devices adapted to support a blank and a triblet rod in alinement with each other; means adapted to impart a relative movement between the rod and blank to assemble the blank on the said rod; and means adapted to bring said rod with the blank assembled thereon and the die into working position with respect to each other, substantially as described.

2. In a tube drawing machine, the combination with a die; of devices adapted to support a blank and a triblet rod in alinement with each other; means adapted to impart a relative movement between said rod and blank to assemble the blank on said rod; and means adapted to bring said rod and the die in and out of line with each other and said rod with the blank assembled thereon and the die into working position with respect to each other, substantially as described.

3. In a tube drawing machine, the combination with a die; of devices adapted to support a blank and a triblet rod in alinement with each other; means adapted to impart a relative movement between said rod and blank to assemble the blank on said rod; and means adapted to move said rod with the blank assembled thereon longitudinally into working position with respect to the die, substantially as described.

4. In a tube drawing machine, the combination with a die; of a trough adapted to receive a blank; means adapted to transfer the blank from its position in the trough to a position in alinement with the triblet rod and support said blank when in such position, so that it can be assembled on said rod by a relative motion between said rod and blank; means for supporting said rod; and means adapted to bring said rod with the blank assembled thereon and the die into working position with respect to each other, substantially as described.

5. In a tube drawing machine, comprising a draw bench and an extension in line therewith, the combination with a triblet rod mounted in said extension; of means for moving the triblet rod into and out of alinement with said draw bench, substantially as and for the purposes described.

6. In a tube drawing machine, comprising a draw bench and extension in line therewith, and feeding mechanism for delivering blanks to said extension on one side of the draw bench, the combination with a triblet rod mounted in said extension; of means for moving the triblet rod alternately into alinement with the draw bench and with the feeding mechanism, substantially as and for the purposes described.

7. In a drawing machine, comprising a draw bench, and an extension in line therewith, the combination with a carrier mounted in said extension; of means for alternately bringing said carrier into and out of alinement with said draw bench, substantially as and for the purposes described.

8. In a drawing machine, comprising a draw bench and extension in line therewith, and feeding mechanism for delivering blanks to said extension on one side of the draw bench, the combination with a carrier mounted in said extension; of means for bringing said carrier alternately into alinement with said draw bench and with said feeding mechanism, substantially as and for the purposes described.

9. In a drawing machine, comprising a draw bench, and an extension in line therewith, the combination with a carrier mounted in said extension; of means for moving said carrier into and out of alinement with the draw bench, and for delivering blanks into said carrier when out of alinement with said draw bench, substantially as and for the purposes described.

10. In a tube drawing machine, comprising a draw bench and extension in line therewith, the combination with a triblet rod mounted in said extension; of means for moving said triblet rod alternately into and out of alinement with the draw bench, and for successively assembling blanks on the triblet rod when out of alinement with the draw bench, substantially as and for the purposes described.

11. In a tube drawing machine, comprising a draw bench and extension in line therewith, the combination with a triblet rod and carrier mounted in said extension; means for bringing said triblet rod and carrier into and out of alinement with the draw bench; and means for successively assembling blanks on the triblet rod when out of alinement with the draw bench, substantially as and for the purposes described.

12. In a tube drawing machine, comprising a draw bench and extension in line therewith, the combination with a triblet rod and carrier mounted in said extension; of means for bringing said triblet rod and carrier alternately into and out of alinement with said draw bench, substantially as and for the purposes described.

13. In a tube drawing machine, comprising a draw bench and extension in line therewith, and feeding mechanism for delivering blanks to said extension on one side of the draw bench, the combination with a triblet rod and carrier mounted in said extension; of means for bringing said triblet rod and carrier alternately into alinement with said draw bench and with said feeding mechanism, substantially as and for the purposes described.

14. In a tube drawing machine, comprising a draw bench and die, and an extension in line therewith, the combination with a triblet rod mounted in said extension; of means for bringing said triblet rod into and out of alinement with said draw bench, and for longitudinally reciprocating said triblet rod with reference to said die, substantially as and for the purposes described.

15. In a drawing machine, comprising a draw bench and die and an extension in line therewith, the combination of a carrier mounted in said extension; of means for bringing said carrier into and out of alinement with said draw bench and for longitudinally reciprocating said carrier with reference to said die, substantially as and for the purposes described.

16. In a tube drawing machine, comprising a draw bench and die and an extension in line therewith, the combination with a triblet rod and carrier mounted in said extension; of means for bringing said triblet rod and carrier into and out of alinement with said draw bench, and for longitudinally reciprocating said triblet rod and carrier with reference to said die, substantially as and for the purposes described.

17. In a drawing machine, comprising a draw bench and extension in line therewith, the combination with a carrier mounted in said extension movable into and out of alinement with the draw bench; of means for delivering blanks into said carrier when out of alinement with the draw bench; and means for moving the blank and carrier into alinement with the draw bench, substantially as and for the purposes described.

18. In a tube drawing machine, comprising an extension and mechanism for delivering blanks on one side of the front end of said extension, the combination with a triblet rod mounted in said extension; of means for bringing said triblet rod into and out of alinement with said blanks as delivered, and for longitudinally reciprocating said triblet rod with reference to said blank delivering mechanism, substantially as and for the purposes described.

19. In a drawing machine, comprising an extension and mechanism for delivering blanks on one side of the front end of said extension, the combination with a carrier mounted in said extension; of means for bringing said carrier into and out of alinement with said blanks as delivered and for longitudinally reciprocating said carrier with reference to said blank delivering mechanism, substantially as and for the purposes described.

20. In a tube drawing machine, comprising an extension and mechanism for delivering blanks on one side of the front end of said extension, the combination with a triblet rod and carrier mounted in said extension; of means for bringing said triblet rod and carrier into and out of alinement with said blanks as delivered, and for longitudinally reciprocating said triblet rod and carrier with reference to said blank delivering mechanism, substantially as and for the purposes described.

21. In a tube drawing machine, comprising a draw bench and die, and an extension in line therewith, the combination with a triblet rod mounted in said extension; of means for longitudinally reciprocating said triblet rod with reference to the die; a back yoke limiting the forward movement of the rod; and means for adjusting the position of the triblet in the die when the rod has reached the limit of its forward movement, substantially as and for the purposes described.

22. In a tube drawing machine, comprising a draw bench and extension in line therewith, the combination with a triblet rod mounted in said extension; of a back yoke; and means for moving the rear end of the triblet rod into and out of engagement with the back yoke, substantially as and for the purposes described.

23. In a tube drawing machine, comprising a draw bench and extension in line therewith, the combination with a triblet rod mounted in said extension; of means connected with the rear end of the triblet rod for longitudinally reciprocating said rod with reference to the draw bench; a carrier for supporting the forward end of the triblet rod; and means connected with said carrier for moving said carrier and triblet rod into and out of alinement with the draw bench, substantially as and for the purposes described.

24. In a tube drawing machine, comprising a draw bench and extension in line therewith, and feeding mechanism for successively delivering blanks on one side of the front end of said extension, the combination with a triblet rod mounted in said extension; of a guide intermediate between said triblet rod and blank, and means for bringing the triblet rod into and out of alinement with said guide, and for imparting longitudinal motion to the triblet rod toward and away from the guide, substantially as and for the purposes described.

25. In assembling mechanism for tube drawing machines, the combination with means for delivering a blank to and supporting it in a given position; of a triblet rod; means for supporting said rod; a guide member intermediate between the blank and rod supporting means; and means adapted to impart a relative movement between said rod, blank and guide to bring the rod and blank into coöperative relation with the guide, and on opposite sides thereof, substantially as described.

26. In assembling mechanism for tube drawing machines, the combination with devices for bringing the triblet rod and blank into alinement; of means intermediate between said blank and triblet rod for guiding the triblet rod and the blank into a fixed position with reference to each other; and means for moving said triblet rod and blank, respectively, into said guiding devices, substantially as and for the purposes described.

27. In assembling mechanism for tube drawing machines, the combination with devices for bringing the triblet rod and blank into alinement, and for moving them each toward the other; of a guiding mechanism comprising two sections presenting converging guiding surfaces to the triblet rod and to the blank, respectively; and means for adjusting said sections vertically with reference to each other, substantially as and for the purposes described.

28. In assembling mechanism for tube drawing machines, the combination with a guide divided into two sections presenting converging guiding surfaces to the blank and to the triblet rod, respectively; of means for adjusting said sections vertically with reference to each other; and means for moving the triblet rod into one of said sections, and for moving the blank into the other of said sections, substantially as and for the purposes described.

29. In feeding mechanism for drawing machines, the combination with means on which a series of blanks may be laterally propelled in a given direction; of a reciprocating member; an escapement feed adapted to release one blank at a time operated by said member; a movable carrier for receiving the escaping blank actuated by said member; and mechanism for reciprocating said member controlled by the movement of the carrier, substantially as described.

30. In feeding mechanism for drawing machines, the combination with means on which a series of blanks may be laterally propelled in a given direction; of a reciprocating member; feed fingers mounted on opposite sides of said member and actuated thereby adapted to engage blanks; and means for regulating the distance between said fingers, substantially as described.

31. In a drawing machine, the combination with means for laterally propelling a series of blanks toward a dip trough; of an escapement feed permitting said blanks to escape one at a time into said trough; a carrier located in said dip trough for receiving the blank; and means for lifting said carrier and blank out of the dip trough and operating said escapement feed simultaneously, substantially as and for the purposes described.

32. In a drawing machine, the combination with means for laterally propelling a series of blanks to a dip trough; of an escapement feed permitting said blanks to escape one at a time into the dip trough; a carrier located in said dip trough for receiving the blank; means for lifting the blank and carrier out of the dip trough and operating said escapement feed simultaneously; and mechanism for discharging the blank from the carrier, substantially as and for the purposes described.

33. In a tube drawing machine, comprising a draw bench, extension in line therewith, and devices for delivering a blank on one side of the front end of said extension, the combination with a triblet rod and carrier mounted in said extension; of means for assembling said blank on the triblet rod, and means for moving the drawhead and assembling the blank simultaneously, substantially as and for the purposes described.

34. In a drawing machine, comprising a draw bench, extension in line therewith, and devices for delivering a blank on one side of the front end of said extension, the combination with a carrier for receiving said blanks; of means connected with the drawhead for pushing a blank out of said carrier during the movement of the drawhead, substantially as and for the purposes described.

35. In a tube drawing machine, comprising a draw bench, extension in line therewith, and means for delivering a blank on one side of the front end of said extension, the combination with a carrier for receiving said blank; of a triblet rod mounted in said extension, means for moving said carrier in and out of alinement with said rod, and means adapted to impart a relative movement between said rod and blank when said carrier is in such alinement to assemble the blank on the rod, substantially as described.

36. In a drawing machine, comprising a draw bench, extension in line therewith, and means for delivering a blank on one side of the front end of said extension, the combination with a carrier for receiving said blank; of a support for said blank mounted in said extension, means for moving said receiving carrier in and out of alinement with said support; and a pusher arm adapted to impart a transference of said blank from said carrier to said support when said carrier is in such alinement, substantially as described.

37. In a drawing machine, the combination with a draw bench; of gripping jaws adapted to positively grip the blank during the drawing operation; yielding means for closing the jaws, said jaws being opened for the reception of the blank by contact with the blank itself, substantially as described.

38. In a drawing machine, the combination with a draw bench; of a draw head; jaws slidably mounted on said drawhead; means for closing said jaws; and means on said draw bench adapted to actuate said jaw closing means as the drawhead is moved toward the die, substantially as described.

39. In a tube drawing machine, comprising a draw bench and extension and triblet rod mounted in said extension, the combination with a reciprocating drawhead; of mechanism for moving said triblet rod into and out of alinement with the draw bench; and means controlled by the drawhead for causing said mechanism to be actuated when the drawhead reaches the desired position, substantially as and for the purposes described.

40. In a drawing machine, comprising a draw bench and extension and carrier mounted in said extension, the combination with a reciprocating drawhead; of mechanism for moving said carrier into and out of alinement with the draw bench; and means controlled by the drawhead for causing said mechanism to be actuated when the drawhead reaches the desired position, substantially as and for the purposes described.

41. In a tube drawing machine, comprising a draw bench and extension and triblet rod and carrier mounted in said extension, the combination with a reciprocating drawhead; of mechanism for moving said triblet rod and carrier into and out of alinement with the draw bench; and means controlled by the drawhead for causing said mechanism to be actuated when the drawhead reaches the desired position, substantially as and for the purposes described.

42. In a tube drawing machine, comprising a draw bench and extension and triblet rod mounted in said extension, the combination with a reciprocating drawhead; of mechanism for moving said triblet rod longitudinally with reference to the draw bench; and means controlled by the drawhead for causing said mechanism to be actuated when the drawhead reaches the desired position, substantially as and for the purposes described.

43. In a tube drawing machine, comprising a draw bench, extension and means for delivering a blank in front of one side of said extension, the combination with a reciprocating drawhead; of a triblet rod mounted in said extension, mechanism for bringing said triblet rod alternately into alinement with the draw bench and with the blank as delivered; and means controlled by the drawhead for causing said mechanism to be actuated when the drawhead reaches alternate desired positions, substantially as and for the purposes described.

44. In a drawing machine, comprising a draw bench, extension and means for delivering a blank in front of one side of said extension, the combination with a reciprocating drawhead; of a carrier mounted in said extension; mechanism for bringing said carrier alternately into alinement with the draw bench and with the blank as delivered; and means controlled by the drawhead for causing said mechanism to be actuated when the drawhead reaches alternate desired positions, substantially as and for the purposes described.

45. In a tube drawing machine, comprising a draw bench, extension and means for delivering a blank in front of one side of said extension, the combination with a reciprocating drawhead; of a carrier and triblet rod mounted in said extension; mechanism for bringing said carrier and triblet rod alternately into alinement with the draw bench and with the blank as delivered; and means controlled by the drawhead for causing said mechanism to be actuated when the drawhead reaches alternate desired positions, substantially as and for the purposes described.

46. In a tube drawing machine, comprising a draw bench and drawhead reciprocating therein, and an extension and triblet rod mounted therein, the combination with mechanism for moving the triblet rod into and out of alinement with the draw bench; of means operated by the drawhead for controlling the operation of the triblet rod mechanism; and means operated by the triblet rod mechanism for controlling the reciprocation of the drawhead; substantially as and for the purposes set forth.

47. In a drawing machine, comprising a draw bench, and drawhead reciprocating therein, and an extension, and carrier mounted in said extension; the combination with mechanism for moving the carrier into and out of alinement with the draw bench, of means operated by the drawhead for controlling the operation of the carrier moving mechanism, and means operated by the carrier moving mechanism for controlling the reciprocation of the drawhead, substantially as and for the purposes described.

48. In a tube drawing machine, the combination with a die mounted thereon; of a triblet rod; devices to support the triblet rod; a drawhead; and means for operating said drawhead; and mechanism adapted to bring said die, support, with triblet rod and drawhead into working position in timed relation with each other to engage the blank by the drawhead, substantially as described.

49. In a tube drawing machine, the combination with a die mounted thereon; of devices adapted to support a blank and a triblet rod in alinement with each other; means adapted to impart a relative movement between said rod and blank to assemble the blank on said rod; a drawhead; means for operating said drawhead; and means adapted to bring said triblet rod, said die and said drawhead into working position with each other to draw the blank after it is assembled on said rod, substantially as described.

50. In a tube drawing machine, the combination with a die mounted thereon; of devices adapted to support a blank and a triblet rod in alinement with each other; means adapted to impart a relative movement between said rod and blank to assemble the blank on said rod; means adapted to bring said rod and said die into alinement and to pass the grip of the blank through said die after the blank is assembled on said rod, substantially as described.

51. In a tube drawing machine, the combination with devices adapted to support a blank and a triblet rod in alinement with each other, means adapted to impart a relative movement between the rod and blank to assemble the blank on said rod; and means adapted to deliver a blank laterally to said supporting means, substantially as described.

52. In a tube drawing machine, the combination with a dip trough; means adapted to support a blank in said trough; means adapted to support a triblet rod in alinement with said blank; and means adapted to impart a relative movement between said rod and blank to assemble the blank on said rod, substantially as described.

53. In a tube drawing machine, the combination with a dip trough; of means adapted to support a blank in said trough; means adapted to deliver a blank laterally to said supporting means; and means adapted to discharge said blank longitudinally therefrom, substantially as described.

54. In assembling mechanism for tube drawing machines, the combination with a guide member; of means for delivering a blank to and supporting it in alinement with said guide member; of a triblet rod; means for supporting said rod in alinement with said guide member; and means adapted to impart a relative movement between said rod and blank to assemble the blank on said rod, substantially as described.

55. In a drawing machine, the combination with a dip trough; of a carrier in said trough; means adapted to move said carrier in the trough; means adapted to feed a blank to said carrier; and means adapted to discharge the blank from said carrier after its movement, substantially as described.

56. In a drawing machine, comprising a draw bench and an extension in line therewith, the combination with a die mounted thereon; a support for a blank mounted on said extension; means adapted to deliver a blank to said support; and means adapted to pass the grip of the blank when so assembled through said die, substantially as described.

57. In a drawing machine, comprising a draw bench and an extension in line therewith, the combination with a die mounted thereon; a support for a blank mounted on said extension; means adapted to deliver a blank to said support; and means adapted to bring said support with the blank assembled thereon and said die into working position with each other and to pass the grip of the blank through said die, substantially as described.

58. In a tube drawing machine, comprising a draw bench and an extension in line therewith, the combination with a die on said bench; means adapted to support a triblet rod; a carrier adapted to support a blank when assembled on said rod; means adapted to synchronously bring said rod and carrier with the blank thereon and said die into working position with each other, substantially as described.

59. In a tube drawing machine, comprising a draw bench and an extension in line therewith, the combination with means adapted to support a triblet rod on said extension; of a checking device mounted on said extension; and means adapted to bring said triblet rod into engagement with said checking device to limit the longitudinal movement of said triblet rod, substantially as described.

60. In assembling mechanism for tube drawing machines, the combination with a guide; of a triblet rod; mechanism for laterally feeding a blank into said guide; means for bringing the triblet rod into and out of alinement with said guide; and further means for longitudinally moving said blank out of said guide and over said triblet rod when said triblet rod and guide are in alinement, substantially as and for the purposes described.

61. In assembling mechanism for tube drawing machines, the combination with a guide; of a carrier; mechanism for laterally feeding a blank into said guide; means for bringing the carrier into and out of alinement with said guide; and further means for longitudinally moving said blank out of said guide on to said carrier when said carrier and guide are in alinement, substantially as and for the purposes described.

62. In assembling mechanism for tube drawing machines, the combination with a guide; of a triblet rod; a carrier; mechanism for laterally feeding a blank into said guide; means for bringing the triblet rod and carrier into and out of alinement with said guide; and further means for longitudinally moving said blank out of said guide and over said triblet rod and on to said carrier when said triblet rod and carrier are in alinement with said guide, substantially as and for the purposes described.

63. In a drawing machine, the combination with a drawbench; of a drawhead; jaws movably mounted on said drawhead; spring actuated mechanism for closing the jaws and means on said drawbench for placing in operation said spring actuated mechanism operated by the movement of the drawhead, substantially as described.

64. In a tube drawing machine, the combination with devices adapted to support a blank and a triblet rod in alinement with each other; means adapted to impart a relative movement between the rod and blank to assemble the blank on said rod, substantially as described.

65. In a tube drawing machine, the combination with a carrier for receiving a blank; of a triblet rod; means adapted to support said triblet rod; means adapted to move said carrier in and out of alinement with said rod; and means adapted to impart a relative movement between said rod and carrier when said carrier is in such alinement to assemble the blank on the rod, substantially as described.

66. In feeding mechanism for drawing machines, the combination with means for laterally propelling a series of blanks; of an escapement feed consisting of a plurality of alternating fingers adapted to engage the successive blanks; means for operating said fingers; and a device for regulating the distance between said fingers, substantially as described.

67. In feeding mechanism for drawing machines, the combination with means for laterally propelling a series of blanks; of an oscillating member, feed fingers mounted on opposite sides of said member and actuated thereby, adapted to engage blanks; and a rod, carrying devices engaging said fingers to regulate the distance between them by the movement of said rod, substantially as described.

68. In feeding mechanism for drawing machines, the combination with means for laterally propelling a series of blanks; of an escapement feed adapted to release one blank at a time; a movable carrier adapted to receive said released blank; and means for operating the carrier and actuating the escapement to release one of said blanks when the carrier is in its proper position to receive the blank, substantially as described.

69. In a drawing machine, the combination with a draw bench, of a movable draw head, jaws movably mounted on said draw head, spring actuated mechanism normally ineffective to close said jaws, and means for operating said spring actuated mechanism to close the jaws yieldingly at a definite point in the travel of the draw head; substantially as described.

70. In a drawing machine, the combination with a draw bench; of a drawing surface; a member for propelling the blank through the drawing surface; controlling mechanism for said propelling member; and means for governing said controlling mechanism by the contact of the blank with the drawing surface, substantially as described.

71. In a drawing machine, the combination with a draw bench; of a die; a triblet rod; a draw head; controlling mechanism for said draw head; and means for governing said controlling mechanism by the contact of the blank with the die and triblet rod, substantially as described.

72. In a drawing machine, the combination with a draw bench; of a die; a triblet rod; a drawhead; controlling mechanism for said drawhead; and means for releasing said controlling mechanism for operation by the movement of the triblet rod away from the die, substantially as described.

73. In a drawing machine, the combination with a draw bench; of a die; a member for propelling the blank through the die; and means for bringing the blank into operative relation with the die and propelling member actuated by the movement of said member, substantially as described.

74. In a drawing machine, the combination with a draw bench; of a drawhead; a triblet rod; and means for assembling a blank on said rod actuated upon the movement of said drawhead, substantially as described.

75. In a drawing machine, the combination with a draw bench; of a die; a drawhead; a triblet rod; and means for bringing the triblet rod with the assembled blank into working position with said die and drawhead, and means for locking said triblet rod in such position, substantially as described.

76. In a draw bench, the combination with a drawing surface, of a draw head, mechanism for moving said draw head in opposite directions, and reversing mechanism for said first named mechanism actuated by the release of the blank from said drawing surface, substantially as described.

77. In a draw bench, the combination with a drawing surface, of a draw-head, means for operating said draw-head, and gripping surfaces on said draw-head adapted to release the blank by the release of the latter from the drawing surface, said draw bench and draw-head having coöperating openings for the discharge of the blank when so released; substantially as described.

78. In a drawing machine, the combination of a draw bench, a die, a draw-head for drawing the blank, means for operating said draw-head, controlling mechanism for said draw-head operating means, and governing means for said controlling mechanism, including a member engaged by the blank during the drawing operation; substantially as described.

79. In a drawing machine, the combination of a die, a movable draw head having jaws to grip the blank and draw it through said die, and means for yieldingly closing said jaws at a definite point in the travel of the draw head, substantially as described.

80. In a drawing machine, the combination of a die, a movable drawing head having jaws to grip the blank and draw it through said die, and means for yieldingly closing said jaws, operative automatically as the draw head approaches said die, substantially as described.

81. In a drawing machine, the combination of a drawing surface, and a draw head to draw the blank, provided with means whereby the blank will be released automatically when the drawing operation is complete and permitted to drop clear of the draw head, substantially as described.

82. In a drawing machine, the combination of a die, and a draw head for drawing the blank through said die, having jaws constructed and arranged to release the blank by the passing of the same out of the die, said draw head being constructed to permit the blank to drop vertically when it is released by said jaws, substantially as described.

83. In a drawing machine, the combination of a bench having a longitudinal opening, a die, and a draw head to coöperate with said die movable above the longitudinal opening of the bench and constructed to release the blank as a result of the passing of the blank out of the die and to permit it to fall through said longitudinal opening of the bench, substantially as described.

84. In a drawing machine, in combination with a die, a draw head having an opening in its lower lower part to permit discharge of the blank, substantially as described.

85. In a drawing machine, in combination with a die, a draw head having jaws to grip the blank, and an opening to permit discharge of the blank by gravity when the blank is released from said jaws, substantially as described.

86. In a drawing machine, the combination of a bench having a longitudinal opening, a die, and a draw head movable over said longitudinal opening of the bench and provided with jaws to grip the blank and with an opening in line with the bench opening to permit free discharge of the blank through both of said openings, substantially as described.

87. In a drawing machine, the combination of a die, and a draw-head having jaws constructed and arranged to release the blank by the passing of the same out of the die, said draw-head also having an opening in its lower part to permit the discharge of the blank when so released; substantially as described.

88. In a drawing machine, the combination of drawing mechanism, blank feeding mechanism, and a prime mover for one of said mechanisms controlled by the other mechanism, substantially as described.

89. In a drawing machine, the combination of drawing mechanism, blank feeding mechanism, a reversible prime mover for one of said mechanisms, and means for reversing said prime mover by movement of the other mechanism, substantially as described.

90. In a drawing machine, the combination of a die, a blank support, and a draw head movable in one direction to draw the blank through the die, and having means to mount the blank on said support as said draw head is moved in the opposite direction, substantially as described.

91. In a drawing machine, a die and a blank support, relatively movable into and out of alinement with each other, and a draw head movable in one direction to mount the blank on said support when said die and support are out of alinement, and movable in the other direction to draw the blank through the die when the latter and said support are in alinement, substantially as described.

92. In a tube drawing machine, the combination of a die, a triblet rod, and a draw head movable in one direction to draw the blank through the die, and having means to mount the blank on the triblet rod as said draw head is moved in the other direction, substantially as described.

93. In a tube drawing machine, a triblet rod and a die, relatively movable in a lateral direction into and out of alinement, and a reciprocatory draw head to draw the blank through the die, arranged to push the blank onto the triblet rod on the return stroke of said draw head, substantially as described.

In witness whereof, I have hereunto set my hand on the 5th day of December, 1960.

WILLIAM R. WEBSTER.

Witnesses:
JOHN K. BEACH,
SAMUEL H. FISHER.